(12) United States Patent
Zhu et al.

(10) Patent No.: US 11,838,722 B2
(45) Date of Patent: Dec. 5, 2023

(54) TERMINAL DEVICE

(71) Applicant: VIVO MOBILE COMMUNICATION CO.,LTD., Guangdong (CN)

(72) Inventors: Lei Zhu, Guangdong (CN); Shuang Wu, Guangdong (CN); Changhong Xie, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 253 days.

(21) Appl. No.: 17/505,769

(22) Filed: Oct. 20, 2021

(65) Prior Publication Data

US 2022/0038814 A1 Feb. 3, 2022

Related U.S. Application Data

(63) Continuation of application No. PCT/CN2020/083170, filed on Apr. 3, 2020.

(30) Foreign Application Priority Data

Apr. 24, 2019 (CN) .......................... 201910334738.4

(51) Int. Cl.
*H04R 1/44* (2006.01)
*H04R 9/02* (2006.01)
*H04R 9/06* (2006.01)

(52) U.S. Cl.
CPC ................. *H04R 1/44* (2013.01); *H04R 9/02* (2013.01); *H04R 9/06* (2013.01); *H04R 2400/11* (2013.01)

(58) Field of Classification Search
CPC ... H04R 1/44; H04R 9/02; H04R 9/06; H04R 2400/11
See application file for complete search history.

(56) References Cited

U.S. PATENT DOCUMENTS

| | | | |
|---|---|---|---|
| 2004/0081325 A1 | 4/2004 | Rautio et al. | |
| 2016/0277851 A1 | 9/2016 | Bas et al. | |
| 2017/0179369 A1 | 6/2017 | Garcia de Alba Garcin et al. | |
| 2019/0011959 A1* | 1/2019 | Yazaki | H04R 1/00 |
| 2019/0158960 A1 | 5/2019 | Zhang et al. | |

FOREIGN PATENT DOCUMENTS

| | | |
|---|---|---|
| CN | 1856179 A | 11/2006 |
| CN | 201878204 U | 6/2011 |
| CN | 202395966 U | 8/2012 |

(Continued)

*Primary Examiner* — Andrew L Sniezek
(74) *Attorney, Agent, or Firm* — Price Heneveld LLP

(57) ABSTRACT

In a terminal device in this application, a device housing includes an installation space and a first inner cavity that are isolated from each other. A speaker is installed in the installation space. The speaker includes a speaker shell provided with a sound hole and a second inner cavity, and a vibrating piece, a signal amplifier, and a speaker body that are disposed in the second inner cavity. The first inner cavity and the second inner cavity are isolated from each other. A circuit board is installed in the first inner cavity. The circuit board is provided with a sound signal processing module and a vibration sound wave generation device. The vibration sound wave generation device is connected to the sound signal processing module. The vibration sound wave generation device converts a sound signal from the sound signal processing module into a vibration signal.

10 Claims, 3 Drawing Sheets

(56) References Cited

FOREIGN PATENT DOCUMENTS

| | | |
|---|---|---|
| CN | 103188588 A | 7/2013 |
| CN | 104219592 A | 12/2014 |
| CN | 206042080 U | 3/2017 |
| CN | 206332841 U | 7/2017 |
| CN | 206350046 U | 7/2017 |
| CN | 109982220 A | 7/2019 |
| EP | 3166338 A1 | 5/2017 |
| JP | 2012124606 A | 6/2012 |
| KR | 20180031457 A | 3/2018 |
| WO | 2017185788 A1 | 11/2017 |

\* cited by examiner

US 11,838,722 B2

TERMINAL DEVICE

CROSS-REFERENCE TO RELATED APPLICATIONS

This application is a continuation application of PCT International Application No. PCT/CN2020/083170 filed on Apr. 3, 2020, which claims priority to Chinese Patent Application No. 201910334738.4, filed in China on Apr. 24, 2019. The disclosures of these applications are incorporated herein by reference in their entireties.

TECHNICAL FIELD

This disclosure relates to the communications field, and in particular, to a terminal device.

BACKGROUND

With the rapid development of technologies and the improvement of people's living and consuming standards, terminal devices have become an indispensable tool in people's life, work, and entertainment. Meanwhile, along with the differentiation of life and entertainment styles, users are demanding higher environmental adaptability of terminal devices, such as water proofing, dust proofing, and adaptability to high and low temperatures.

For a terminal device in the related art, a speaker is connected conductively to a pad typically through a spring plate, so as to receive electrical signals to produce sound. A sound cavity of the speaker is typically formed by enclosing a main board of the terminal device against which foam is firmly pressed. However, wiring design on the surface of the main board may lead to an uneven surface, resulting in some gaps between the foam and the main board, and further leading to air leakage or liquid leakage of the sound cavity. Consequently, this affects the sound quality and overall waterproof performance of the speaker, and thus limits application environments of the terminal device. Once liquid is leaked into the terminal device, the main board is prone to burnout and a contact position of the spring plate is prone to problems such as corrosion due to electrochemical reactions, resulting in damage of the terminal device. Therefore, users are imposing urgent requirements on waterproofing of terminal devices.

SUMMARY

This disclosure discloses a terminal device, to resolve the problems in the related art of air leakage and relatively poor waterproofing performance of a sound cavity of a speaker in a terminal device.

To resolve the foregoing problems, the following technical solutions are used in this disclosure:

A terminal device is provided and includes:

a device housing, where the device housing includes an installation space and a first inner cavity that are isolated from each other;

a speaker, where the speaker is installed in the installation space, and the speaker includes a speaker shell provided with a sound hole and a second inner cavity, and a vibrating piece, a signal amplifier, and a speaker body that are disposed in the second inner cavity, where the first inner cavity and the second inner cavity are isolated from each other; and a circuit board, where the circuit board is installed in the first inner cavity, the circuit board is provided with a sound signal processing module and a vibration sound wave generation device, the vibration sound wave generation device is connected to the sound signal processing module, the vibration sound wave generation device converts a sound signal from the sound signal processing module into a vibration signal, the vibration piece vibrates under the action of the vibration signal and generates an electrical signal, the signal amplifier is connected to the vibration piece and amplifies the electrical signal, and the speaker body is connected to the signal amplifier and produces sound based on the amplified electrical signal through the sound hole.

The following beneficial effects can be achieved by the technical solutions used in this disclosure:

In the terminal device disclosed in this disclosure, under the control of a control part of the terminal device, the sound signal processing module emits a sound signal, and the vibration sound wave generation device converts the sound signal into a vibration signal. The vibration signal is essentially a vibration sound wave. During propagation, the sound wave is transmitted to the speaker shell through air or components of the terminal device, and finally transmitted to the vibration piece in the speaker shell. The vibration piece vibrates to produce an electrical signal, and the electrical signal is amplified by the signal amplifier and transmitted to the speaker body. The speaker body makes sound based on the amplified electrical signal, and eventually produces sound through the sound hole of the speaker. Therefore, the speaker disclosed in the embodiment of this disclosure is a passive speaker. The second inner cavity of the speaker shell may be isolated from the first inner cavity of the device housing, without affecting sound production of the speaker. In this case, foreign objects such as dust or water that enters the speaker may not enter the device housing of the terminal device, implementing optimal dust-proof and water-proof performance. Because of isolation between the second inner cavity and the first inner cavity, the speaker is free of the problem of relatively poor sound effects caused by air leakage.

BRIEF DESCRIPTION OF DRAWINGS

The drawings described herein are used to provide a further understanding of this disclosure and constitute a part of this disclosure. The example embodiments of this disclosure and their descriptions are used to explain this disclosure, and do not constitute any inappropriate limitation on this disclosure. In the drawings.

REMARKS 100. device housing
200. speaker; 210. speaker shell; 211a. sound hole; 211b. sound hole; 220. vibration piece; 221. first permanent magnet; 222. second permanent magnet; 223. ferromagnetic vibration diaphragm; 230. signal amplifier; 240. speaker body; 250. controller
300. sound signal processing module
400. vibration sound wave generation device

DESCRIPTION OF EMBODIMENTS

To make the objectives, technical solutions, and advantages of this disclosure clearer, the following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

With the accompanying drawings, the following clarifies the technical solutions disclosed in the embodiments of this disclosure in detail.

Figure 1:
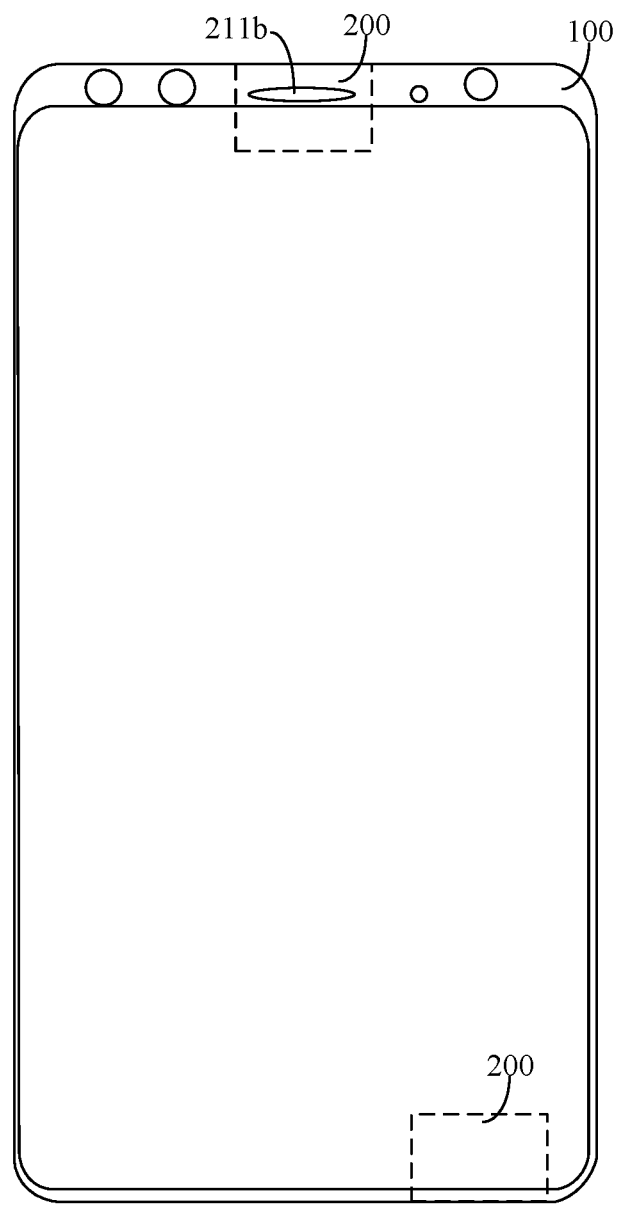
FIG. 1 is a schematic structural diagram of a terminal device according to an embodiment of this disclosure.
Figure 2:
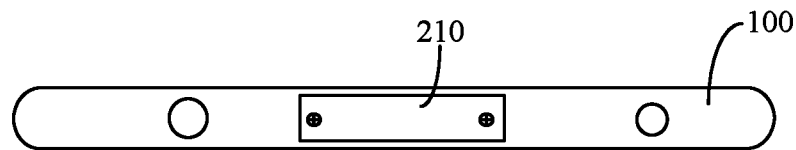
FIG. 2 and FIG. 3 are a top view and a bottom view of FIG. 1, respectively.
Figure 3:
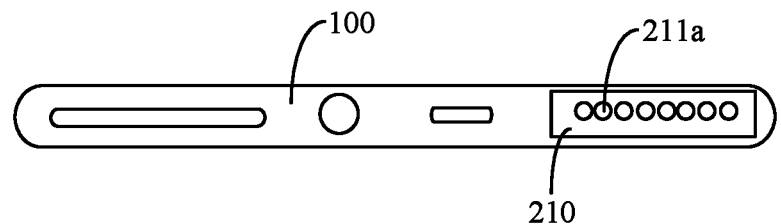
Figure 4:
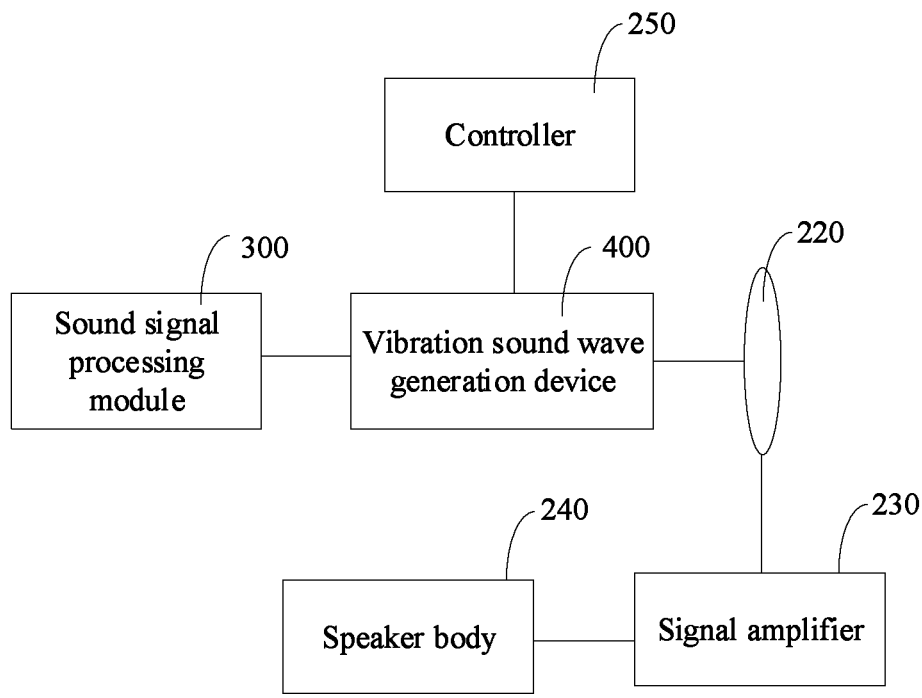
FIG. 4 is a partial schematic structural diagram of a terminal device according to an embodiment of this disclosure.
Figure 5:
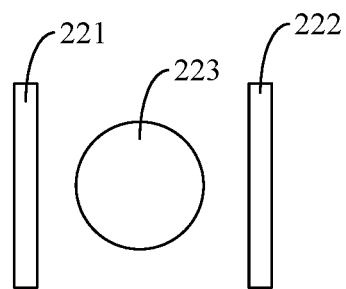
FIG. 5 is a schematic structural diagram of a vibration piece of another terminal device according to an embodiment of this disclosure.

Referring to FIG. 1 to FIG. 5, an embodiment of this disclosure discloses a terminal device, where the terminal device includes a device housing 100, a speaker 200, a circuit board, a sound signal processing module 300, and a vibration sound wave generation device 400.

The device housing 100 is a basic component of the terminal device. The device housing 100 provides an installation base for other components of the terminal device. Meanwhile, some structures need to be provided in the device housing 100 to facilitate some functional parts to work.

In the embodiments of this disclosure, the device housing 100 includes an installation space and a first inner cavity, where the installation space is configured to provide room for installing the speaker 200. The speaker 200 is installed in the installation space. Generally, the device housing 100 may include a middle frame, where the installation space is provided in the middle frame of the device housing 100. The first inner cavity is an internal space of the device housing 100, and main components such as a battery and the circuit board of the terminal device are usually installed in the first inner cavity. In this embodiment of this disclosure, the installation space and the first inner cavity are isolated from each other.

A speaker 200 includes a speaker shell 210, a vibration piece 220, a signal amplifier 230, and a speaker body 240. The speaker shell 210 includes a sound hole and a second inner cavity. The vibration piece 220, the signal amplifier 230, and the speaker body 240 are all disposed in the second inner cavity of the speaker shell 210. The second inner cavity and the first inner cavity are isolated from each other to prevent foreign objects such as dust or water from entering the first inner cavity through the second inner cavity of the speaker shell 210. Specifically, the speaker 200 is installed to the device housing 100 by using the speaker shell 210. In a specific implementation, the speaker shell 210 can be secured to the device housing 100 using a threaded connector.

The circuit board is installed in the first inner cavity. The sound signal processing module 300 and the vibration sound wave generation device 400 are disposed on the circuit board. Generally, the sound signal processing module 300 and the vibration sound wave generation device 400 are fastened onto the circuit board through surface mounting.

In this embodiment of this disclosure, the circuit board may be a main board of the terminal device, or an auxiliary board of the terminal device. Generally, the auxiliary board has a relatively smaller area, facilitating installation and disassembly for repairing or replacing electronic components installed thereon. Therefore, in an optional solution, the sound signal processing module 300 and the vibration sound wave generation device 400 may be configured on the auxiliary board of the terminal device.

The sound signal processing module 300 is configured to emit a sound signal, the vibration sound wave generation device 400 is connected to the sound signal processing module 300, and the vibration sound wave generation device 400 is configured to convert the sound signal into a vibration signal. The vibration piece 220 vibrates under the action of the vibration signal and generates an electrical signal, that is, the vibration piece 220 converts the vibration signal to the electrical signal. The signal amplifier 230 is connected to the vibration piece 220, and the signal amplifier 230 amplifies the electrical signal, so that the speaker body 240 receives a clearer electrical signal.

The speaker body 240 is a main component of the speaker 200, and the speaker body 240 is capable of producing sound for the speaker 200. The speaker body 240 is connected to the signal amplifier 230 and produces sound based on the amplified electrical signal through the sound hole, implementing sound producing for the speaker 200. In this embodiment of this disclosure, the sounding principle of the speaker body 240 is a well-known art, which is not repeated herein.

The working process of the terminal device according to this embodiment of this disclosure is as follows:

Under the control of a control part of the terminal device, the sound signal processing module 300 emits a sound signal, and the vibration sound wave generation device 400 converts the sound signal into a vibration signal. The vibration signal is essentially a vibration sound wave. During propagation, the sound wave is transmitted to the speaker shell through air or components of the terminal device, and finally transmitted to the vibration piece 220 in the speaker shell 210. The vibration piece 220 vibrates to produce an electrical signal, and the electrical signal is amplified by the signal amplifier 230 and transmitted to the speaker body 240. The speaker body 240 makes sound based on the amplified electrical signal, and eventually produces sound through the sound hole of the speaker 200.

Based on the previous working process, the speaker disclosed in the embodiments of this disclosure is a passive speaker. The second inner cavity of the speaker shell 210 may be isolated from the first inner cavity of the device housing 100, without affecting sound production of the speaker 200. In this case, foreign objects such as dust or water that enters the speaker 200 may not enter the device housing 100 of the terminal device, implementing optimal dust-proof and water-proof performance. Because of isolation between the second inner cavity and the first inner cavity, the speaker 200 is free of the sound effect problem caused by air leakage.

The vibration piece 220 can generate electrical signals after vibration. The vibration piece 220 has many structures to realize its functions. In a specific embodiment, the vibration piece 220 may be a piezoelectric diaphragm. The piezoelectric diaphragm is a laminated structure made of piezoelectric materials. The piezoelectric diaphragm vibrates after receiving vibration sound waves to produce electrical signals. In the case that the vibration piece 220 is a piezoelectric diaphragm, the structure of the vibration piece 220 is relatively simple. Specifically, the piezoelectric diaphragm may be a piezoelectric ceramic sheet, that is, being made of a piezoelectric ceramic material. The piezoelectric diaphragm made of a piezoelectric ceramic material has high strength and high-temperature resistance, so the speaker 200 in the embodiments of this disclosure may have a wider scope of application. Of course, the piezoelectric diaphragm may alternatively be made of piezoelectric materials such as piezoelectric crystals and polyvinylidene fluoride. The embodiments of this disclosure do not limit the specific types of piezoelectric materials.

To further improve the vibration sensitivity of the vibration piece 220, under the premise that the vibration piece 220 is a piezoelectric diaphragm, the piezoelectric diaphragm may be attached to the inner wall of the speaker shell 210. In this case, during the propagation process of vibration sound waves through the speaker shell 210, the vibration of the speaker shell 210 directly drives the piezoelectric diaphragm to vibrate together. Specifically, the piezoelectric diaphragm may be attached to the inner wall of the speaker shell 210.

Of course, the vibration piece 220 may have other structures. In another specific embodiment, the vibration piece 220 disclosed in this embodiment may include a first permanent magnet 221, a second permanent magnet 222, and a ferromagnetic vibration diaphragm 223, where the ferromagnetic vibration diaphragm 223 is disposed between the first permanent magnet 221 and the second permanent magnet 222. The ferromagnetic vibration diaphragm 223 is electrically connected to the signal amplifier 230. In a specific process, driven by a vibration sound wave, the ferromagnetic vibration diaphragm 223 vibrates in a magnetic field formed by the first permanent magnet 221 and the second permanent magnet 222, essentially cutting magnetic induction lines, further generating current, and eventually forming an electrical signal. In this case, the vibration piece 220 may be formed by using an ordinary raw material, helping reduce costs of the speaker 200.

In this embodiment of this disclosure, the signal amplifier 230 is configured to amplify the signal generated by the vibration piece 220. There are many types of electronic devices that can amplify the electrical signal. In this embodiment of this disclosure, the signal amplifier may be a passive signal amplifier.

In this embodiment of this disclosure, at least two speakers 200 are provided. In a specific embodiment, two speakers 200 may be provided, and the two speakers 200 may be disposed at the top and bottom of the device housing 100 respectively, to produce sounds at different parts of the terminal device.

To facilitate use by the user, in an optional solution, the sound hole 211b of the speaker 200 located at the top of the device housing 100 may be disposed at the top surface of the device housing. The sound hole 211a of the speaker 200 located at the bottom of the device housing 100 may be disposed at the bottom surface of the device housing, thus producing sounds at two sides. It should be noted that, in general, a terminal device includes a display and a battery cover. The display and the battery cover are arranged facing away from each other. The top and bottom surfaces of the device housing 100 are two sides between the display and the battery cover of the device housing 100, facing two sides in a longitudinal direction of the terminal device.

During actual use, the speaker 200 of the terminal device may need the speaker-phone function. Based on this, in an optional solution, the speaker 200 disclosed in this disclosure may also include the controller 250. The controller 250 is connected to the vibration sound wave generation device 400, and the controller 250 is configured to control the amplitude of the vibration signal emitted by the vibration sound generation device 400. By controlling the amplitude of the vibration signal emitted by the vibration sound wave generation device 400, the controller 250 can control switching between a handset function and a speaker-phone function of the speaker 200. In this case, the terminal device uses only one speaker 200, without requiring any additional speaker 200, thereby reducing the entire structural space of the terminal device and reducing power consumption of the terminal device.

The terminal device disclosed in this embodiment of this disclosure may be a mobile phone, a tablet computer, an e-book reader, a game console, a wearable device, and so on. This embodiment of this disclosure constitutes any limitation on a specific type of the terminal device.

The foregoing embodiments of this disclosure focus on differences between embodiments. Provided that the features of improvement of the embodiments do not conflict with each other, the features can be combined to form more preferred embodiments. For conciseness of this specification, details are not further described herein.

The foregoing descriptions are only embodiments of this disclosure and do not constitute any limitation on this disclosure. For those skilled in the art, this disclosure may have different changes and variations. Any modifications, equivalent replacement, improvements, and so on made within the spirit and principles of this disclosure shall fall in the scope of the claims of this disclosure.

What is claimed is:

1. A terminal device, comprising:
   a device housing, wherein the device housing comprises an installation space and a first inner cavity that are isolated from each other;
   a speaker, wherein the speaker is installed in the installation space, and the speaker comprises a speaker shell provided with a sound hole and a second inner cavity, and a vibrating piece, a signal amplifier, and a speaker body that are disposed in the second inner cavity, wherein the first inner cavity and the second inner cavity are isolated from each other; and
   a circuit board, wherein the circuit board is installed in the first inner cavity, the circuit board is provided with a sound signal processing module and a vibration sound wave generation device, the vibration sound wave generation device is connected to the sound signal processing module, the vibration sound wave generation device converts a sound signal from the sound signal processing module into a vibration signal, the vibration piece vibrates under the action of the vibration signal and generates an electrical signal, the signal amplifier is connected to the vibration piece and amplifies the electrical signal, and the speaker body is connected to the signal amplifier and produces sound based on the amplified electrical signal through the sound hole.

2. The terminal device according to claim 1, wherein the vibration piece is a piezoelectric diaphragm.

3. The terminal device according to claim 2, wherein the vibration piece is a piezoelectric ceramic sheet.

4. The terminal device according to claim 2, wherein the piezoelectric diaphragm is attached to an inner wall of the speaker shell.

5. The terminal device according to claim 1, wherein the vibration piece includes a first permanent magnet, a second permanent magnet, and a ferromagnetic vibration diaphragm that is disposed between the first permanent magnet and the second permanent magnet, and the ferromagnetic vibration diaphragm is electrically connected to the signal amplifier.

6. The terminal device according to claim 1, wherein the circuit board is a main board or an auxiliary board of the terminal device.

7. The terminal device according to claim 1, wherein two such speakers are provided, and the two speakers are disposed at the top and bottom of the device housing respectively.

8. The terminal device according to claim 7, wherein the sound hole of the speaker located at the top of the device housing is disposed at a top surface of the device housing and the sound hole of the speaker located at the bottom of the device housing is disposed at a bottom surface of the device housing.

9. The terminal device according to claim 1, wherein the signal amplifier is a passive signal amplifier.

10. The terminal device according to claim 1, further comprising a controller, wherein the controller is connected to the vibration sound wave generation device, and the controller is configured to control an amplitude of a vibration signal emitted by the vibration sound generation device.

* * * * *